Dec. 27, 1938.  O. J. RYDER  2,141,561
TIME CONTROL CONTACTOR
Filed Sept. 6, 1934  2 Sheets-Sheet 2
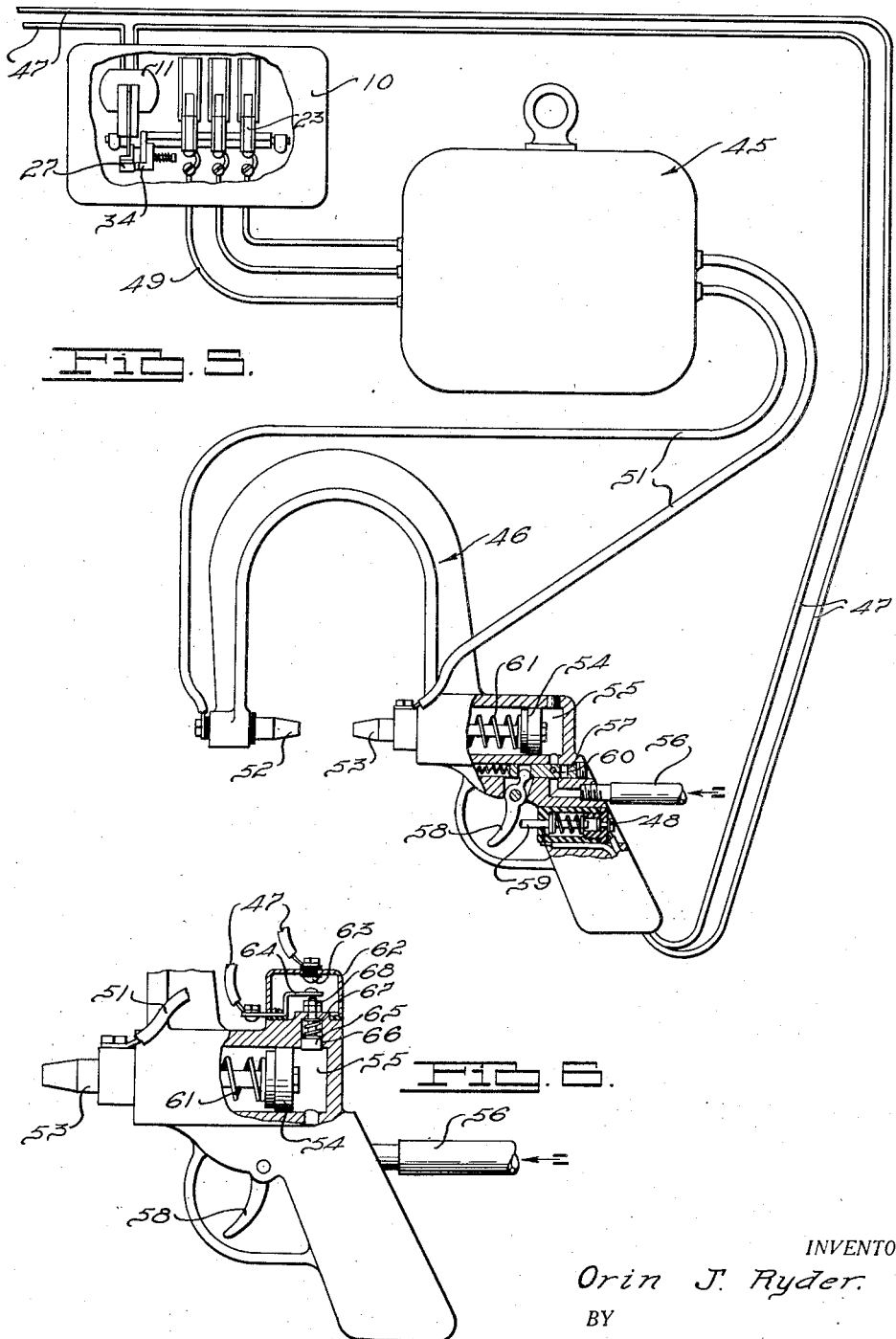

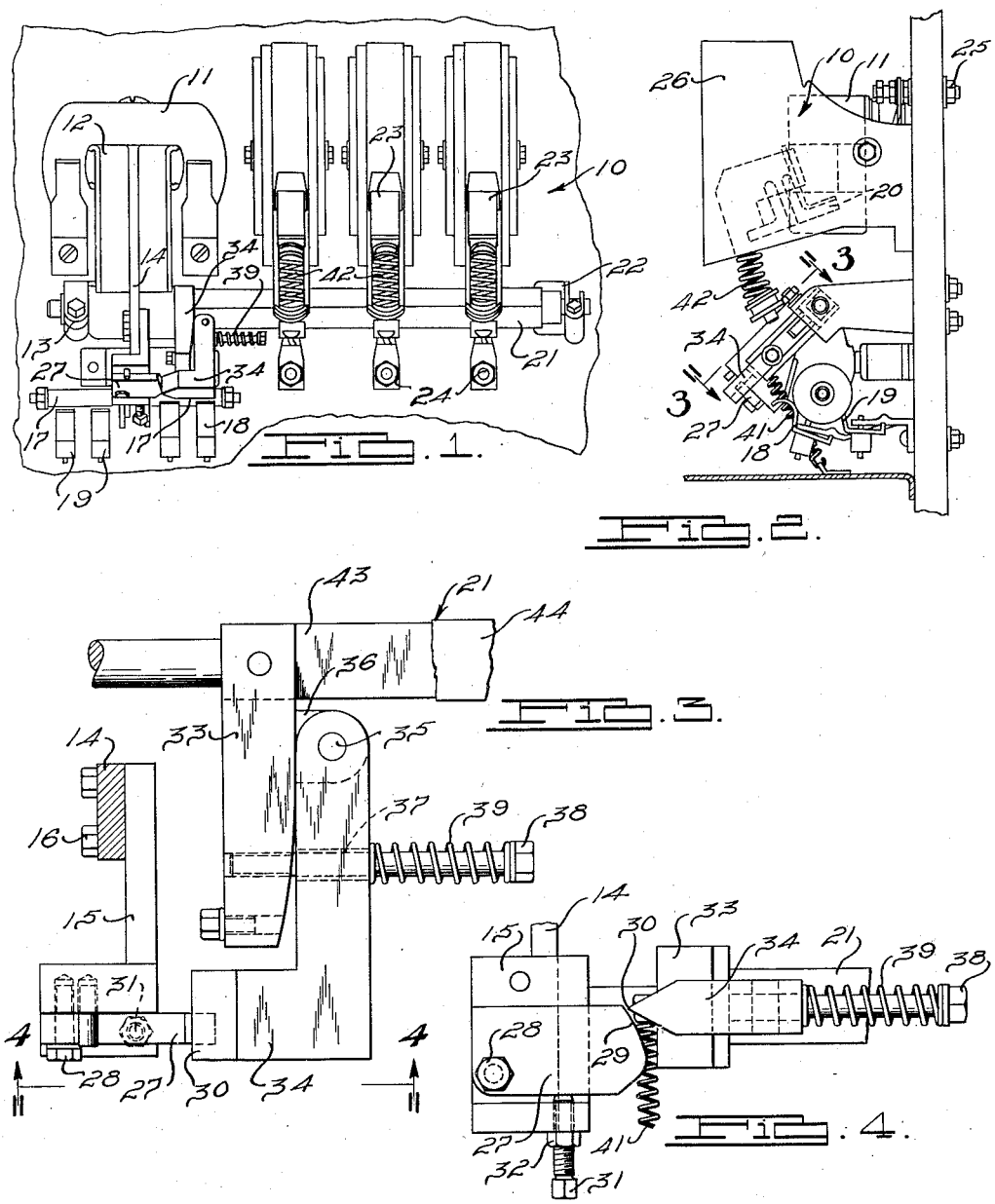

Patented Dec. 27, 1938

2,141,561

UNITED STATES PATENT OFFICE 2,141,561

TIME CONTROL CONTACTOR

Orin J. Ryder, Detroit, Mich., assignor to The Murray Corporation of America, a corporation of Delaware Application September 6, 1934, Serial No. 742,921

5 Claims. (Cl. 200—33)

My invention relates to control relays and particularly to a control relay regulatable to control the time of flow of current through welding electrodes.

Difficulty has been experienced in the welding art when relying upon the personal equation of an operator to effect the sequence in operation of a welding gun. That is to say, in operating the trigger of the gun in proper timed movement to effect the movement of the welding electrodes to clamped position with the work to be welded and for actuating a relay and retaining the relay closed for the proper length of time, terminated by the release of the trigger which de-energizes the relay and effects the release of the electrodes. It is very evident that at different times with the same operator, and through the employment of various operators, different welds will result. If the trigger is moved too rapidly the relay may actually contact to cause a flow of current through the electrodes before the electrodes actually clamp the work. On the other hand, if the trigger is not retained the proper length of time to maintain the relay closed, sufficient current will not flow through the material to effect a proper weld. Further, if the trigger is retained in switch-closed position too long a time, too great a flow of current through the electrodes will occur, causing a burning of the metal.

The present invention eliminates the personal equation above pointed out which varies the quality of the weld obtained when an operator controls the actuation of the welding gun. By the employment of a relay which times the flow of current not only is the proper weld obtained but it was found that the time for making such weld can be materially decreased. This is made possible in view of the fact that since the time is accurately controlled a greater flow of current can be employed for producing the weld. In view of the personal time element it was the practice in the past to reduce the current as much as possible to permit a greater variation in the time the current was flowing.

The relay embodies a solenoid and a plurality of movable contact elements forming a circuit closing device which was actuated thereby. When a three phase circuit is utilized, three sets of contacts are employed and actuated simultaneously. The solenoid is provided with a movable armature which is connected to the circuit closing device through an adjustable cam element. The cam engages a projecting plunger of the device and by adjusting the position of the cam to regulate the length of engagement of the cam surface with the plunger, the time interval the contacts are closed may be lengthened or shortened.

After the plunger passes over the face of the cam, the contacts are released even though the solenoid may remain energized to retain the armature in moved position when the operator retains the switch, for effecting actuation of the solenoid, closed. Suitable means may be employed to assure the operation of the electrodes into engagement with the work before the solenoid is actuated. The one herein illustrated embodies the operation of the switch for closing the current which energizes the solenoids, by the air pressure built up in the electrode actuating cylinder after the piston thereof has been moved to effect the engagement of the electrodes with the work. Other well known forms could be employed, such as providing a cylinder and bleeding valve for controlling the time operation of the trigger of the gun.

Accordingly, the main objects of my invention are: to provide a control relay having means for regulating the time interval during which the contacts thereof remain closed; to employ a time adjustable contact relay by which the time of flow of current through electrodes is accurately controlled; to provide a constant time interval in which the contacts of a relay remain closed so that a greater flow of current may be employed to decrease the time required to effect a welding operation; to provide means for actuating electrodes into work-engaged position before the actuation of a control relay to pass current therethrough and, in general, to provide a time adjustable control relay for regulating the time of flow of current through welding electrodes which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a view in elevation of a control relay embodying features of my invention, Figure 2 is a side view of the structure illustrated in Fig. 1, Figure 3 is an enlarged sectional view of the structure illustrated in Fig. 2, taken on the line 3—3 thereof, Figure 4 is a view of the structure illustrated in Fig. 3, taken on the line 4—4 thereof, Figure 5 is a view of the welding mechanism and relay in connected relation, and Figure 6 is an enlarged view of a portion of the welding mechanism illustrated in Fig. 5, showing a modified form thereof.

Referring to Fig. 1, I have illustrated a control relay 10 as comprising a solenoid 11 having a movable armature 12 pivoted on spaced brackets 13. The armature is provided with an extending arm 14 upon which a cam-supporting bracket 15 is secured by suitable bolts 16. The arm 14 also carries a bridging contact element 17 which bridges a pair of contacts 18 when the solenoid is de-energized and which bridges a pair of contacts 19 when the armature is drawn within the solenoids. A supporting bar 21 is aligned with the pivot 13 of the armature 12 being pivotally retained on suitable brackets 22. The bar carries and actuates a plurality of contacts 23 into engagement with a plurality of stationary contacts 20 to close circuits through terminals 24 and 25. Suitable arc suppressing chutes 26 are disposed over the pairs of contacts in a conventional manner. From Fig. 3 it will be noted that the contact supporting bar 21 has a metal base 43 over which a tube 44 of insulating material is disposed. In this manner, the contacts supported on the bar are insulated from each other.

For interconnecting the armature 12 with the contact supporting bar 21, I have provided a unique time controlling mechanism illustrated enlarged in Figs. 3 and 4 which will now be described. As pointed out above, the armature arm 14 supports a cam bracket 15 upon which a cam plate 27 is retained by a bolt 28 for pivotal movement about the bolt axis. Preferably, an arcuate surface or cam face 29 is provided on the cam plate 27 struck about the axis of the bolt 28. The surface 29 acts as the cam portion of the plate and may be angularly disposed relative to the bolt 28 through the adjustment of a screw 31 clamped in adjusted position by a nut 32. The contact supporting bar 21 is provided with an arm 33 upon which is mounted an L-shaped cam-engaging element, or plunger, 34 for pivotal movement about a pin 35 carried by a lug 36 on the arm 33. An aperture 37 is provided in the element 34 through which a bolt 38 extends which is screwed into the body portion of the arm 33. A spring 39 is disposed about the body of the bolt and urges the element 34 forwardly to be in position to be engaged by the arm 33.

When the solenoid 11 is energized, the armature 12 is drawn therein to have the lower portion of the arm 14 move in a clockwise direction when viewed as illustrated in Fig. 2. That is to say, moves outwardly from the drawings when viewed as illustrated in Fig. 3. The movement of the arm 14 in this manner causes the camming surface 29 of the cam plate 27 to engage the end 30 of the cam engaging element 34 to cause the element to move therewith to thereby rotate the contact supporting bar 21 to cause the contacts 23 to move into engagement with the contacts 20. Further movement of the plate 27 causes the camming surface 29 to move across the point 30 of the cam engaging element 34, which will pivot about the pin 35 against the pressure of the spring 39. After the point 30 passes over the cam face 29 upon the continued movement of the armature and plate 27, the element 34 is released and the contacts 23 will move to open position. This opening movement is effected by a spring 41 assisting springs 42 of the contacts. When the time the contacts 23 remain closed is to be shortened it is only necessary to loosen the nut 32 and to adjust the screw 31 to rotate the plate 27 counter-clockwise about the center of the bolt 28 to reduce the length of the available face portion 29 of the cam and thereby reduce the time the contacts are retained in closed position. When the solenoid 11 is de-energized the armature 12 is returned to open position, the plate 27 being pivoted around the center of the bolt 28 until such times as the cam surface 29 clears the end 30 of the cam-engaging element 34 whereupon the plate will move in a clockwise direction about the bolt 28 into engagement with the screw 31, as illustrated in Fig. 4. The contact relay thus constructed is capable of being regulated to adjust the time the contacts are retained in closed position and, while simple in construction, is rigid and positive of operation.

Referring to Fig. 5, I have illustrated the contactors 10 as being hooked up in a circuit with a transformer 45 and a welding gun 46. The energizing circuit 47 for the solenoid 11 passes through a switch 48 in the welding gun 46 where the circuit is completed and broken. A three phase alternating current circuit (not shown) is connected to the terminals 25 and after passing through the relay is connected by the contacts 24 and the three phase circuit 49 to the transformer 45. The transformer changes the current from the high voltage low current supply to a low voltage high current supply for welding purposes. Suitable conductors 51 connect the circuit from the transformer 45 to a stationary electrode 52 to a movable electrode 53 of the gun 46. The electrode 53 is urged and moved toward the electrode 52 by a piston 54 carried by a cylinder 55 in the welding gun. A suitable supply line 56 conducts a fluid, preferably air, to the gun, the passage to the cylinder 55 being interrupted by a control plunger 57 which is actuated by a trigger 58. The trigger 58 is also in a position to actuate a plunger 59 on the switch 48.

When operating the gun, the electrodes 52 and 53 are positioned to bridge the elements to be welded whereupon the trigger 58 is actuated to permit a flow of fluid into the cylinder 55. The fluid actuates the plunger 54 forwardly to move the electrode 53 toward the electrode 52 and to clamp the work therebetween. Upon further movement, the trigger engages and actuates the plunger 59 to close the circuit 47 to thereby energize the solenoid 11 for actuating the armature 12 and the contacts 23 to closed position. This completes the circuit 49 to the transformer 45 to energize the transformer and pass current through the circuit 51 and the electrodes to effect the welding operation.

The time the current is flowing through the metal to be welded is controlled by the setting of the cam plate 27 which regulates the time which the contact supporting bar 21 is held thereby after which the contacts 23 move to open position during the final forward movement of the armature 12 toward the solenoid 11. In this manner, the current to the electrodes 52 and 33 is shut off independent of the release of the trigger 58 so that a constant timing of current flow results for each weld. The trigger 58 is then released, opening the circuit of the solenoid 11 and cutting off the flow of fluid to the cylinder 55. The fluid in the cylinder passes out through the vent 60 as a spring 61, disposed forwardly of the piston, returns the piston and electrode 53 to their original positions.

As has been pointed out hereinabove, there is a possibility that the trigger 58 will be operated so fast that the solenoid 11 will be actuated to move the armature 12 before the welding electrode 53 has been moved to clamped engagement with the work and the electrode 52. When this occurs, the welding takes place before the actual clamping of the element and improper welds naturally result.

Referring to Fig. 6, I have illustrated a switch 62 which may be employed in place of the switch 48 illustrated in Fig. 5. In this construction, the circuit 47 is directly connected to a stationary contact 63 and a movable contact 64 forming part of the switch 62. A plunger 65 is disposed in an aperture 66 which communicates with the cylinder 55. The plunger has a spring 67 thereon which urges it toward the interior of the cylinder. Suitable washers 68, on the end of the plunger, prevent the movement of the plunger out of the aperture.

When the trigger is operated, air flowing into the cylinder 55, will move the piston 54 to cause the electrode 53 to move into clamped relation with the work to be welded and the electrode 52. Thereupon pressure will build up within the cylinder to cause the operation of the plunger 65 which will move the contact 64 into engagement with the contact 63 to energize the solenoid 11 to effect the weld in the same manner as above explained. Upon the release of the trigger 58, the contact 64 will move away from the contact 63 as the piston 54 is returned to its original position and thereby de-energize the solenoid 11.

In this manner, irrespective of the speed of operation of the trigger 58, the sequence in operation will always remain the same. In either instance, the timing of the flow of current through the weld is positively and accurately controlled, for which reason a greater flow of current may be employed to effect the welding operation, which further reduces the time required to effect the weld.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A contact relay including, in combination, a circuit-closing device, a movable member, a cam carried by said member, means carried by said device engageable by said cam when the member is moved to operate said device and retain the circuit closed while the cam passes over said engageable means, and means for adjusting said cam to regulate the time said means is in engagement therewith.

2. A contact relay including, in combination, a circuit-closing device, a movable member, a cam carried by said member, a spring pressed plunger carried by said device in the path of movement of said cam, and means for adjusting said cam to regulate the time of engagement of said plunger therewith during its movement.

3. A contact relay including, in combination, a device for closing a circuit through welding electrodes, a movable member, means interconnecting the member and device for completing said circuit during a portion of the movement of the member and to release said device before movement of said member is completed, and means for varying the length of time the circuit is completed during the movement of said member.

4. A contact making and breaking device including, in combination, a movable current carrying member, an actuating member, a cam carried by one of said members free to pivot in one direction, means restraining said cam against pivotal movement in the opposite direction, means carried by said other member engageable with said cam and movable therewith when said actuating member is moved to move the current carrying member into circuit closed position, and means permitting said last named means to be released from said cam thereafter and during the movement of said actuating member.

5. A contact making and breaking device including, in combination, a movable current carrying member, an actuating member, a cam carried by one of said members free to pivot in one direction, means restraining said cam against pivotal movement in the opposite direction, means carried by said other member engageable with said cam and movable therewith when said actuating member is moved to move the current carrying member into circuit closed position, and means permitting said last named means to be released from said cam thereafter and during the movement of said actuating member, said means for restraining said cam against movement being adjustable to vary the time of engagement with said engageable means.

ORIN J. RYDER.